United States Patent [19]

Glazunov et al.

[11] Patent Number: 4,980,055
[45] Date of Patent: Dec. 25, 1990

[54] SOLUTION PERMEATOR

[75] Inventors: Viktor S. Glazunov, Rostovskaya; Felix N. Karelin, Moscow; Lev L. Ostroukhov, Rostovskaya; Jury A. Sitnyakovsky, Moscow; Alexandr K. Chernyshov, Moscow; Evgeny B. Jurchevsky, Moscow, all of U.S.S.R.

[73] Assignee: Vsesojuzny Nauchno-Issledova Telsky I Proektno-Konstruktorsky Institut, Moscow, U.S.S.R.

[21] Appl. No.: 475,318

[22] Filed: Feb. 5, 1990

[51] Int. Cl.$^5$ ............................................. B01D 61/08
[52] U.S. Cl. .................................. 210/96.2; 210/247; 210/321.89; 210/500.23
[58] Field of Search ................. 210/96.2, 247, 500.23, 210/321.89

[56] References Cited

U.S. PATENT DOCUMENTS 3,228,877  1/1966  Mahon ........................ 210/500.23 X
4,141,835  2/1979  Schael et al. ................ 210/500.23 X Primary Examiner—Frank Spear
Attorney, Agent, or Firm—Ladas & Parry

[57] ABSTRACT

A permeator has a cylindrical body whose filtration chamber accommodates a membrane element. Arranged to both sides from the filtration chamber along the axis of the body are permeate withdrawal chambers, communicating with the membrane element by way of permeate withdrawal pipe branches and each furnished with its own permeate withdrawal pipe branch.

7 Claims, 2 Drawing Sheets

SOLUTION PERMEATOR

FIELD OF THE ART

The present invention relates to units for desalination and demineralization of natural and waste water and, more speicifically, to a solution permeator.

Field of the Invention

The present invention can be utilized in heat-and nuclear power engineering to produce feed water for steam generators and nuclear reactors, and in the chemical and electronic industries to produce especially clean water for preparing solutions. Besides, the invention may find applications in agriculture and public utilities to desalinate water, in the food industry—to concentrate solutions, e.g., the wastes of dairies as well as in many other industries to purify waste water.

Background of the Invention

Today in most solution permeators use is made of the supply of a solution to be separated and withdrawal of a permeate (filtrate), and in certain constructions—also the withdrawal of a concentrate from the side of the ends of the permeator body which complicates the assembly of permeators, particularly when replacing membrane elements therein.

There is known in the art a reverse-osmotic permeator (U.S. Pat. No. 3,386,583), comprising a cylindrical body with a pipe branch to withdraw the concentrate. This body accommodates a membrane element. The body ends are closed with lids, one of which housing a pipe branch to withdrawn the solution to be separated, and the other—a pipe branch to withdraw the permeate.

In the known permeator the feed of a solution to be separated, collection and withdrawal of the permeate are effected with the aid of flexible tubes, and it is necessary to seal the places where they are connected to the pipe branches to prevent leakages. Replacing the membrane element in the permeator calls for the removal of all connecting tubes, thereby making the process cumbersome.

It should be noted that in present-day conditions there are hundreds of permeators and certain difficulties arise when assembling and servicing these permeators in the unit.

In order to control the quality of water obtained (the values of PH, salt content and other indicators) provision is made in the known permeator for special chambers arranged outside the body thereof, because in the body per se it is impossible to accommodate respective sensors. This quality control makes the unit cumbersome.

Widely knwon in the art is another reverse-osmotic permeator "Romembra", manufactured by Toray Industries, Inc., Japan, which is substantially identical to the one described hereinabove. The difference lies in that the concentrate outlet branches pass through the same lid as the permeate outlet branch. Problems related to the permeator assembly and measuring quality of the permeate obtained are the saame as those outlines above.

Today, there is also known a solution permeator ('Chemistry-87 ' Exhibition catalogue, Section "Soviet Exhibits", 1987, Moscow), comprising a cylindrical body wherein a membrane element fitted with two permeate outlet branches is mounted in the body filtration chamber provided with the branches for supplying the solution to be separated and withdrawing the concentrate.

Although in the known construction from each side of the permeator body there is a pipe branch to withdraw the permeate it is still inconvenient to assemble the permeator because it is necessary to hermetically connect the flexible tube to the said pipe branch and the lid—to the body flange, thus imparing the permeator reliability.

Quality of the permeate obtained is determined outside the permeator which complicates the unit construction.

BRIEF DESCRIPTION OF THE INVENTION

It is an object of the present invention to streamline the permeator assembly.

It is another object of the invention to enhance reliability of the permeator.

The objects set forth are achieved due to the fact that the solution permeator incorporates a cylindrical body which accommodates a filtration chamber furnished with pipe branches to feed a solution to be separated and to withdraw a concentrate; in the filtration chamber provision is made for a membrane element fitted with two pipe branches to withdraw the permeate; the permeate withdrawal chambers are arranged in the cylindrical body coaxially thereto and to both sides from the filtration chamber, each of said chamber communicating with the membrane element by way of the permeate withdrawal pipe branch and having its own permeate withdrawal pipe branch.

It is expedient that each permeate withdrawal chamber should be formed by the wall of the cylindrical body and two lids mounted perpendicular to its axis, one of said lids is secured at the end of said cylindrical body and the other accommodates a membrane element permeate withdrawal pipe branch, and should incorporate means for fixing mutual arrangement of the lids.

It is reasonable that the means for fixing mutual arrangement of the lids represents a sleeve with holes made on its cylindrical surface which is arranged coaxially to the permeate withdrawal chamber and contacts with the lids by its ends.

It is desirable that the means for fixing mutual arrangement of the lids be made in the form of at least two studs disposed substantially parallel to the permeate withdrawal chamber, rigidly secured in one of the lids and contacting with the other lid.

It is advantageous that the means for fixing mutual arrangement of the lids be made in the form of two split thrust rings mounted along the perimeter of the cylindrical body wall and which contact with the lids.

It is convenient that at least one of the permeate withdrawal chambers should be provided with a hole to accommodate a sensor of the value of permeate electric conductivity.

The solution permeator of the invention ensures feeding of the solution to be separated and withdrawing the concentrate and permeate from the side of the lateral surface of the body which facilitates the assembly and disassembly of the permeator when the membrane element thereof is replaced.

Besides, the permeator of the invention lacks detachable joints of the permeate withdrawal branches with the connecting flexible tubes which improves reliability in operation and makes it possible to rule out leakages.

In the permeator of the invention provision is made for control of the quality of the permeate obtained directly in the apparatus proper due to the arrangement of permeate withdrawal chambers therein. This allows timely changing the filtration mode or switching off the apparatus to replace its membrane element.

BRIEF DESCRIPTION OF THE DRAWINGS

The invention will become more apparent by describing a specific examplary embodiment thereof and accompanying drawings, wherein.

DETAILED DESCRIPTION OF THE INVENTION

Figure 1:
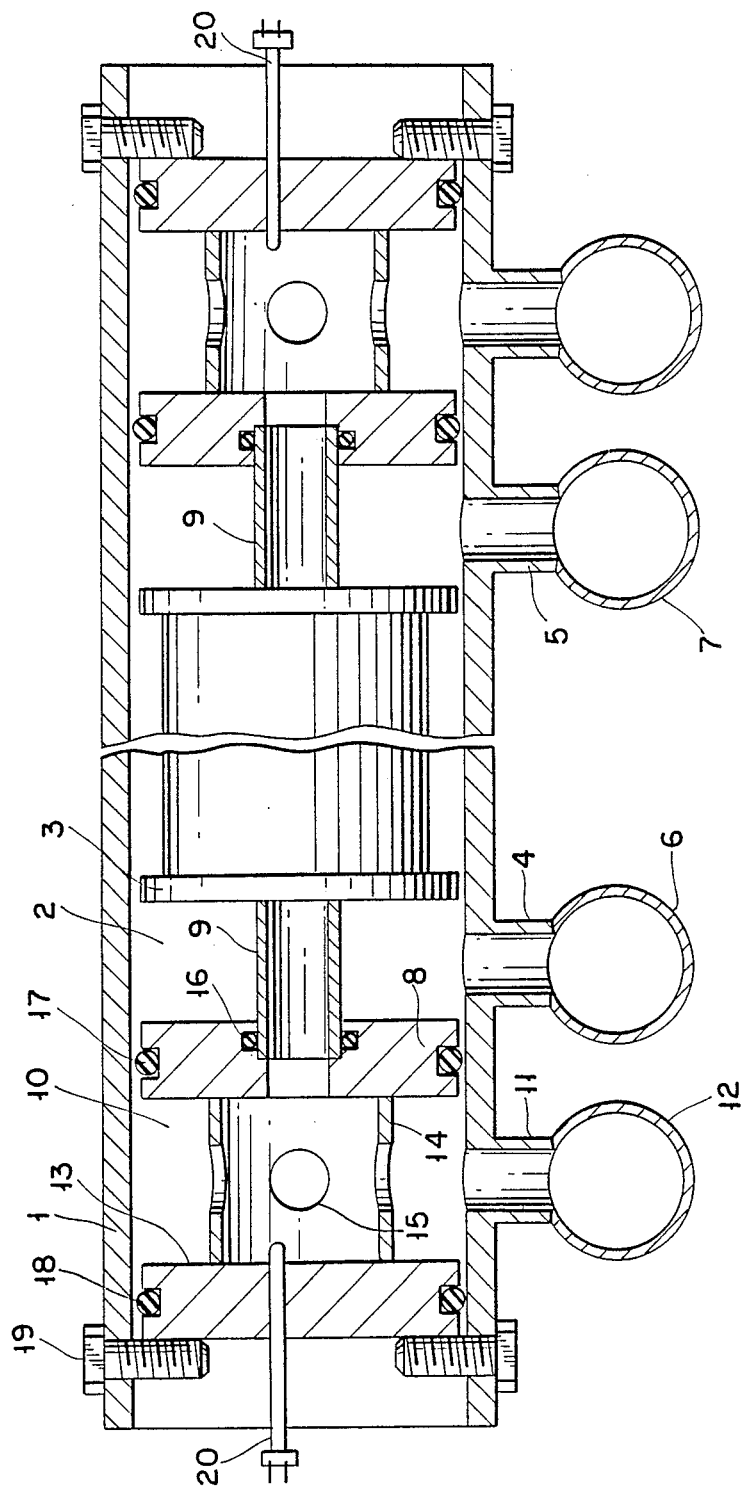
FIG. 1 is a longitudinal section of the solution permeator, according to the invention.

A solution permeator comprises a cylindrical body 1 (FIG. 1) where a chamber 2 to filter a solution being separated accommodates a membrane element 3 coaxially to the body 1. This membrane element 3 may be spiral and cylinder-shaped. The filtration chamber 2 is furnished with pipe branches 4,5 to feed the solution to be separated and to withdraw a concentrate which are rigidly connected to respective collectors 6,7. The filtration chamber 2 is formed by the wall of the cylindrical body 1 and tow lids 8 mounted perpendicular to the axis of the body 1 and to both sides from the membrane element 3 fitted with permeate withdrawal pipe branches 9 disposed in the holes of the lids 8.

Arranged to both sides from the filtration chamber 2 along the axis of the body 1 are permeate withdrawal chambers 10, each of which communicates with the membrane element 3 by way of the pipe branch 9 and has its own permeate withdrawal pipe branch 11 rigidly linked with a collector 12. Each permeate withdrawal chamber 10 is formed by a lid 13 mounted perpendicular to the body 1 axis and secured at the end of the body 1, a lid 8 and the wall of the body 1 and is furnished with means for fixing mutual arrangement of the lids 8, 13.

In the described exemplary embodiment the means for fixing mutual arrangement of the lids represents a sleeve 14 mounted coaxially to the body 1 and having holes 15 for the permeate to pass from the pipe branch 9 directly to the chamber 10. The sleeve 14 can be welded to one of the lids 8, 13 or annular grooves (not shown in the drawing) may be provided in the lids 8, 13 to accommodate said sleeve.

In order to prevent the solution to be separated from flowing from the filtration chamber 2 to the permeate withdrawal chamber 10 the permeator is provided with sealers 16, 17 arranged between the pipe branch 9 and the hole in the lid 8, the lateral surface of the lid 8 and the inner cylindrical surface of the body 1. The lid 13 has a sealer 18 mounted identically to the sealer 17 of the lid 8 and designed to prevent permeate leakage from the body 1.

The sealer 16 can take the form of a ring, and the sealers 17, 18 - the form of rings or rubber-fabric or polymer cups.

The lid 13 is secured in the body 1 with the aid of screws 19.

In the described variant in order to control quality of the permeate obtained (the value PH, values of salt content and other indicators) at least one chamber 10 is provided with a hole to accommodate a sensor 20 of the value of electric conductivity of the permeate. Various indicators of quality of the obtained permeate are determined from signals in the sensor 20.

Using the sensor 20 it is possible to regularly control the quality of the permeate obtained directly in the permeator per se, thereby appreciably improving its operating reliability.

Figure 2:
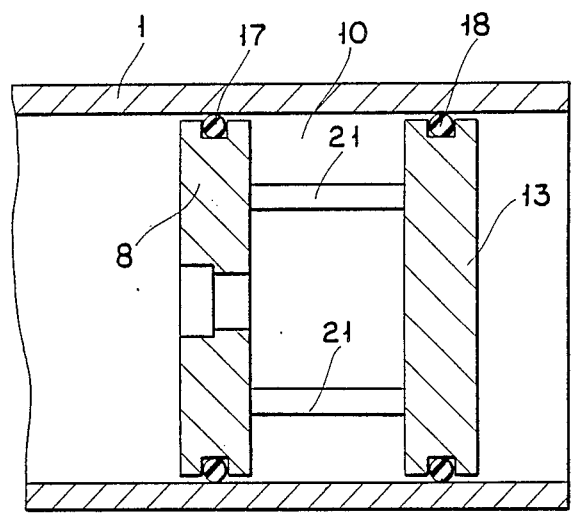
FIG. 2 is a longitudinal section of part of the permeate withdrawal chamber with means for fixing mutual arrangement of lids made in the form of studs, according to the invention.
Figure 3:
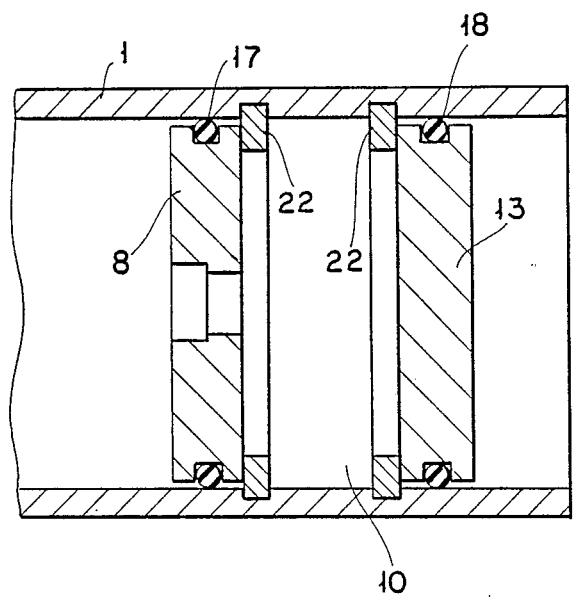
FIG. 3 is the same as in FIG. 2 with means for fixing mutual arrangement of lids which is made in the form of split thrust rings, according to the invention.

The means for fixing mutual arrangement of the lids 8, 13 in other variants can be made either in the form of, at least, two studs 21 (FIG. 2) (in the described variant—three studs 21) disposed substantially parallel to the axis of the body 1 and welded to one of the lids 8, 13, or in the form of two split thrust rings 22 (FIG. 3) secured in the body 1 and adjacent to the lids 8, 13.

In case the body 1 of the permeater is made from stainless steel, it is expedient that the means for fixing mutual arrangement of the lids 8, 13 be made in the form of split thrust rings 22, and provided the body 1 is made from aluminium alloys, it is preferable that the sleeve 14 (FIG. 1) or the stud 21 (FIG. 2) should be used.

When replacing the membrane element 3 (FIG. 1), the permeator is disassembled in the following order. First, the sensors 20 are taken out, the screws 19 are turned out, the lid 13, sleeve 14 and the lid 8 removed, thereupon, the membrane element 3 is withdrawn. Hence, there is no need to remove flexible tubes and disconnect the flanges, as is the case in all prior art construction.

The permeator is assembled in reverse order.

The solution permeator operates as follows.

From the collector 6 (FIG. 1) the solution to be separated is fed via the pipe branch 4 under pressure of the order of 1.6 MPa into the filtration chamber 2 to the end of the membrane element 3. As the solution, passes along the channels between semi-permeable membranes, it is filtered and the filtered off solution (permeate) flows down the radial channels and is collected in the central channel of the membrane element 3 (channels of the membrane element are not shown) communicating with the pipe braches 9. Via the pipe branches 9 the permeate is fed to the cavity of the sleeve 14 and through the holes 15 of the latter—to the permeate withdrawal chamber 10 where peressure of the order of 0.1 to 0.2 MPa is maintained, and further along the pipe branch 11 to the collector 12.

The unfiltered-off part of the solution, which has passed through the membrane element 3, is withdrawn along the pipe branch 5 to the collector 7.

The sealers 16, 17 helps prevent possible flows of the solution to be separated which are stipulated by the differentce of pressure in the chambers 2, 10, and the sleeve 14, studs 21 (FIG. 2) or split thrust rings 22 (FIG. 3) hold the lid 8 in a preset position to preseve a constant valume of the permeate withdrawal chamber 10.

As the permeator works, quality of the permeate obtained is controlled by means of the sensors 20 (FIG. 1) and information from the latter is processed automatically.

Thus, the permeator of the invention is easy to assemble, reliable in operation and it is possible to constantly control the quality of the permeate obtained.

What we claim is:

1. A solution permeator, comprising:
   a cylindrical body;

a filtration chamber arranged in said cylindrical body and having a pipe branch to feed a solution to be separated and a pipe branch to withdraw a concentrate;

a membrane element mounted in said filtration chamber and furnished with two permeate withdrawal pipe branches;

first and second permeate withdrawal chambers arranged is said cylindrical body coaxially thereto and to both sides from said filtration chamber, each communicating via said permeate withdrawal pipe branch with said membrane element and having its own permeate withdrawal pipe branch.

2. A permeator as claimed in claim 1, comprising:

first and second lids mounted perpendicular to the axis of said cylindrical body and secured at the ends of said cylindrical body;

third and fourth lids mounted perpendicular to the axis of said cylindrical body which form jointly with the first and second lids and the wall of said body the first and second permeate withdrawal chambers, in so doing, the third and fourth lids accommodate said permeate withdrawal pipe branches of said membrane element;

first means for fixing mutual arrangement of the first and third lids disposed therebetween and contacting with the first and third lids;

second means for fixing mutual arrangement of the second and fourth lids mounted therebetween and contacting with the second and fourth lids.

3. A permeator as claimed in claim 2, wherein each first and second fixing means comprises:

a sleeve having a cylindrical surface and the ends, which is mounted coaxially to its own said permeate withdrawal chamber and said ends, and interacts with its own said lids and has a group of holes made in said cylindrical surface of said sleeve.

4. A permeator as claimed in claim 2, wherein each first and second fixing means comprises:

a group of studs, equal in number to at least two which are mounted substantially parallel to the axis of its own said permeate withdrawal chamber and are secured in one of said lids and contact with the other said lid.

5. A permeator as claimed in claim 2, wherein each first and second fixing means comprises:

first and second split thrust rings mounted along the perimeter of the wall of said cylindrical body and contacting by their own said lids.

6. A permeator as claimed in claim 1, wherein at least the first or second permeate withdrawal chamber is provided with a hole to accommodate a sensor of the value of electric conductivity of the permeate.

7. A permeator as claimed in claim 2, wherein at least the first or second permeate withdrawal chamber is provided with a hole to accommodate a sensor of the value of electric conductivity of the permeats.

* * * * *